Patented June 19, 1928.

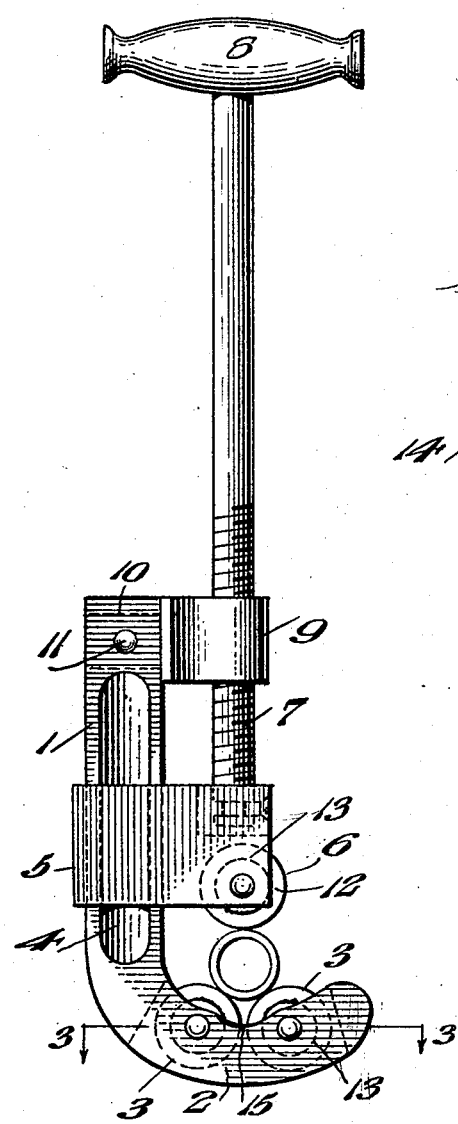
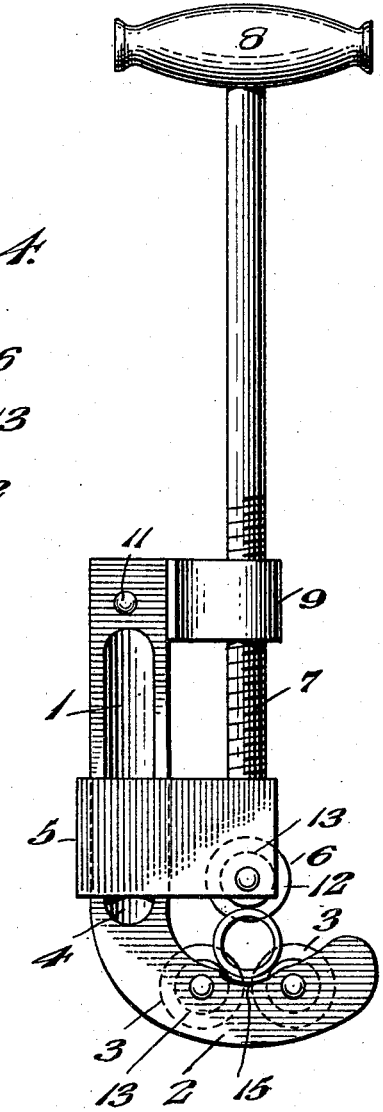
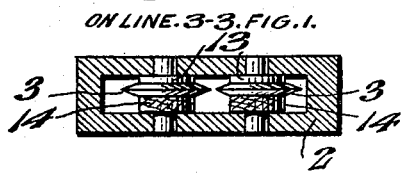

1,674,440

UNITED STATES PATENT OFFICE.

ALFRED C. McCLOSKEY, OF PHILADELPHIA, PENNSYLVANIA.

PIPE CUTTER AND BURR REMOVER.

Application filed October 22, 1924. Serial No. 745,053.

In pipe cutters of the type herein set forth heretofore constructed, there has always been an outside burr left on the pipe after cutting, and it has been necessary to remove this burr after the pipe is cut with a file or other tool.

The object of my present invention is to devise a novel construction and arrangement of a pipe cutter wherein provision is made for removing the outside burr from the pipe which has been cut.

With the above and other objects in view, my invention comprehends a novel construction of a pipe cutter.

It further comprehends a novel construction of cutters having means to remove the burr from the cut pipe.

Other novel features of construction and advantage will hereinafter more clearly appear in the detailed description and the appended claims.

For the purpose of illustrating the invention, I have shown in the accompanying drawing a typical embodiment of it, which, in practice, will give reliable and satisfactory results. It is, however, to be understood that this embodiment is typical only and that the various instrumentalities of which my invention consists can be variously arranged and organized, and that the invention is not limited to the precise arrangement and organization of these instrumentalities as herein set forth.

Figure 1 is a side elevation of a pipe cutter embodying my invention, illustrated in assembled condition with the pipe ready to effect the cutting operation.

Figure 2 is a side elevation of the cutter showing the parts assembled in conjunction with a pipe from which the outside burr is to be removed.

Figure 3 is a section on line 3—3 of Figure 1.

Figure 4 is a front elevation of one of the combined cutter and roller, in detached position.

Similar numerals of reference indicate corresponding parts.

Referring to the drawings:

As is well known to those skilled in the art, when a pipe is cut by means of a pipe cutter, a burr is left at the outer peripheral edge of the cut portion, and unless this burr is removed it is difficult for the operator to center the pipe when the thread is being cut, and if the thread is not cut straight, the thickness of the pipe is reduced at certain points, thereby weakening the pipe, and bringing it out of alignment when connected.

1 designates the body portion of a pipe cutter embodying my invention, the forward end of which is curved in the usual manner as at 2 and has journalled in it cutters 3.

The body portion is recessed in the usual manner on opposite sides as at 4 for the sake of reducing material. The shoe or slide 5 in which is mounted the cutter 6 is slidable on the body portion. The shoe or slide 5 has connected to it in the usual manner at one end the threaded rod 7, the opposite end of which is provided with an actuating handle 8. This rod 7 is longitudinally movable in a guide 9 having a shank which is fixed in the aperture 10 of the body portion by means of a tapered pin 11.

The cutters are all of the same construction. Each cutter, for example the cutter 6, is provided with the cutting disc 12 and the hub 13 which on one side is extended to form a burr removing roller 14 so that a substantial bearing area is provided.

The surface of this roller is preferably slightly roughened or knurled, as shown, in order to prevent the pipe from slipping out from between the rolls while being rolled.

In some cases it is advantageous to have the inner face of the curved arm 2 provided with the recesses 15 on opposite sides which provides clearance for the pipe when the burr is being removed.

The operation will now be apparent to those skilled in this art and is as follows:

When a pipe is to be cut, the pipe is placed between the cutters, as shown in Figure 1, and the handle 8 is actuated to bring the cutting discs of the cutter 6 against the pipe. The cutter or pipe is then rotated in the usual manner, and the pipe is cut off. The pipe is now in the position seen in Figure 2 so that all that it is necessary for the operator to do to remove the burr, is to screw in the threaded rod 7 and revolve the pipe cutter around the pipe or vice versa, and the rollers formed by the extended bearing area 14 on the cutters 3 and 6 will effectively remove the burr. The cutters are all preferably of the same construction and can have their positions reversed, in case the operator is left-handed.

The guide bearing 9 can readily be removed by the removal of the tapering pin 11 if for any reason it is desired to remove the shoe or slide 5 from the body portion.

When the pipe is to be cut off, it is held in a suitable holder and after the pipe is cut, the rollers are in burr removing position by a slight advancement of the cutter 6. The burr is removed from the main section of pipe and if it is desired to remove the burr from the section cut off, such section is placed in a suitable holder or pipe vise and the pipe cutter applied so as to bring its rollers into operative position.

If the burr is left on the pipe, it is usually too large in diameter to enter the guide of the threading device.

It is within the scope of this invention to employ combined cutters and rollers as herein shown with a manually actuated or a power actuated pipe cutter, or with a pipe cutting machine with a threading attachment.

In devices of this character as heretofore constructed, the guide 9 has been inserted into an aperture in the body portion and riveted or swaged therein; while in my construction it simply has a working fit in the aperture 10 and by drifting out the pin 11 it can readily be removed or replaced as may be desired.

In cutting pipe it is essential that the outside diameter of the pipe is not burred or made too large to enter the guide or die of the threading device. If a burr has been produced it must be removed. Rolling this burr down is the easiest, quickest and best method to remove it. A pipe on which the burr has been removed by rolling is more even and true in shape than if the burr had been removed with a file or hammer, as is now usually done, and as it often happens the pipe may be a little under size and fit in the guide of the threading device loosely, and if the end of the pipe is not true it is likely to be threaded crooked.

Several kinds of pipe cutters have been made in combination with burr removing parts or appliances, but in practice these have been generally discarded as they have proved to be slow and cumbersome.

The ordinary three wheel cutter, now in general use, has many advantages as it is quick cutting and does not have to be revolved around the pipe more than half-way, and the wearing parts are easily replaced, but the objection to a wheel cutter is that it does raise a burr, and if this wheel cutter is used in combination with a roller which is always in close proximity to the pipe when it is cut off, the burr is easily and quickly removed by rolling the burr down again by bringing the rollers against the pipe.

It will be understood that it is within the scope of this invention to have the rollers integral with or separate from the cutters, and if the burr removing device is to be used for the removal only of the burr, then the cutters can be dispensed with and a separate burr removing device formed, or if desired replaceable cutters and rollers can be provided for the same device. It will be apparent from the disclosure that after the pipe is entirely cut off and the end of the pipe which is cut off is removed, the burr can be removed by advancing the slide to bring the rollers into contact with the burr and then revolving or oscillating the pipe cutter around the pipe.

It will now be apparent that I have devised a new and useful pipe cutter and burr remover which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent, is:

1. A pipe cutter having a body portion, a plurality of cutters mounted in said body portion, a slide adjustable on said body portion, a cutter mounted in said slide, all of said cutters being of the same construction and being provided with a cutting portion of greater depth than the wall of the pipe to be cut, and having at one side only an elongated roller to form a burr removing member, whereby after the pipe is entirely cut off and the end of the pipe cut off removed, the burr can be removed by advancing the slide to bring the rollers into contact with the burr and then revolving or oscillating the pipe cutter around the pipe.

2. A pipe cutter having a body portion, a plurality of cutters mounted in said body portion, a slide adjustable on said body portion, a cutter mounted in said slide, all of said cutters being of the same construction and being provided with a cutting portion of a greater depth than the wall of the pipe to be cut, and having at one side only a knurled cylindrical roller to form a burr removing member, whereby after the pipe is entirely cut off and the end of the pipe cut off removed, the burr can be removed by advancing the slide to bring the rollers into contact with the burr and then revolving or oscillating the pipe cutter around the pipe.

ALFRED C. McCLOSKEY.